United States Patent
Shi

(10) Patent No.: US 12,000,980 B2
(45) Date of Patent: Jun. 4, 2024

(54) CAMERA OPTICAL LENS

(71) Applicant: AAC Optics (Changzhou) Co., Ltd., Changzhou (CN)

(72) Inventor: Rongbao Shi, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 665 days.

(21) Appl. No.: 17/134,506

(22) Filed: Dec. 28, 2020

(65) Prior Publication Data

US 2021/0382278 A1     Dec. 9, 2021

(30) Foreign Application Priority Data

Jun. 8, 2020   (CN) .......................... 202010509367.1

(51) Int. Cl.
*G02B 13/00*     (2006.01)
*G02B 9/62*      (2006.01)

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/18; G02B 15/146; G02B 27/0012; G02B 13/06
See application file for complete search history.

(56) References Cited

U.S. PATENT DOCUMENTS

2021/0003828 A1 *  1/2021  Lyu .................... G02B 13/0045
2022/0050274 A1 *  2/2022  Tang ........................ G02B 9/62

FOREIGN PATENT DOCUMENTS

| CN | 107272161 A | * | 10/2017 | ......... G02B 13/0045 |
| CN | 107577034 A | * | 1/2018 | ......... G02B 13/0045 |
| CN | 110018551 A | * | 7/2019 | ......... G02B 13/0045 |
| CN | 110426823 A | * | 11/2019 | ......... G02B 13/0015 |

* cited by examiner

*Primary Examiner* — Marin Pichler
*Assistant Examiner* — K Muhammad
(74) *Attorney, Agent, or Firm* — W&G Law Group

(57) ABSTRACT

A camera optical lens includes a first lens to a sixth lens. The camera optical lens satisfies: $6.50 \le f3/f \le 10.00$; $1.50 \le (R3+R4)/(R3-R4) \le 3.00$; $8.00 \le d1/d2 \le 10.50$; $1.50 \le d8/d7 \le 2.00$, where f denotes a focal length of the camera optical lens, f3 denotes a focal length of a third lens, R3 and R4 respectively denotes curvature radiuses of an object side surface and an image side surface of a second lens, d1 denotes an on-axis thickness of the first lens, d2 denotes an on-axis distance from an image side surface of the first lens to an object side surface of the second lens, d7 denotes an on-axis thickness of a fourth lens, and d8 denotes an on-axis distance from an image side surface of the fourth lens to an object side surface of a fifth lens. The camera optical lens has a good optical performance and meets the design requirements for a large aperture, a wide angle and ultra-thinning.

11 Claims, 12 Drawing Sheets

FIG. 1

CAMERA OPTICAL LENS

TECHNICAL FIELD

The present application relates to the field of optical lenses, and more particularly, to a camera optical lens suitable for portable terminal equipment such as smart phones and digital cameras, and camera devices such as monitors and PC lenses.

BACKGROUND

In recent years, with the emergence of smart phones, the demand for miniaturized photographic lenses is increasing day by day, and the photosensitive device of a general photographic lens is nothing more than a Charge Coupled Device (CCD) or a Complementary Metal-oxide Semiconductor Sensor (CMOS Sensor). Moreover, due to the improvement of semiconductor manufacturing technology, the pixel size of the photosensitive devices is reduced. In addition, the development trend of today's electronic products is having good functions with a thin and short appearance. Therefore, miniaturized camera lenses with a good imaging quality have become the mainstream in the current market.

In order to obtain a better imaging quality, traditional lenses mounted on mobile phone cameras mostly adopt a three-piece or four-piece lens structure. In addition, with the development of technology and the increase of diversified needs of users, with the pixel area of photosensitive devices shrinking and the system's requirements for imaging quality increasing, five-piece and six-piece lens structures gradually appear in lens designs. Although the common six-piece lenses have a good optical performance, their optical power, lens spacing and lens shape settings are still unreasonable, which leads to result that the lens structure having a good optical performance fails to meet the design requirements for a large aperture, ultra-thinning and a wide angle.

SUMMARY

In view of the above problems, it is an object of the present application to provide a camera optical lens which has a good optical performance and meanwhile meets the design requirements for a large aperture, ultra-thinning and a wide angle.

To solve the above technical problems, a camera optical lens is provided according to an embodiment of the present application. The camera optical lens includes from an object side to an image side: a first lens having positive refractive power, a second lens having negative refractive power, a third lens having positive refractive power, a fourth lens having negative refractive power, a fifth lens having positive refractive power and a sixth lens having negative refractive power, wherein the camera optical lens satisfies:

$6.50 \le f3/f \le 10.00$;

$1.50 \le (R3+R4)/(R3-R4) \le 3.00$;

$8.00 \le d1/d2 \le 10.50$; and $1.50 \le d8/d7 \le 2.00$, where f denotes a focal length of the camera optical lens,
f3 denotes a focal length of the third lens,
R3 denotes a curvature radius of an object side surface of the second lens,
R4 denotes a curvature radius of an image side surface of the second lens,
d1 denotes an on-axis thickness of the first lens,
d2 denotes an on-axis distance from an image side surface of the first lens to the object side surface of the second lens,
d7 denotes an on-axis thickness of the fourth lens, and
d8 denotes an on-axis distance from an image side surface of the fourth lens to an object side surface of the fifth lens.

As an improvement, the camera optical lens satisfies: $-1.00 \le f6/f \le -0.50$, where f6 denotes a focal length of the sixth lens.

As an improvement, the camera optical lens satisfies:

$0.42 \le f1/f \le 1.43$;

$-3.99 \le (R1+R2)/(R1-R2) \le -1.22$; and $0.05 \le d1/TTL \le 0.18$, where f1 denotes a focal length of the first lens,
R1 denotes a curvature radius of an object side surface of the first lens,
R2 denotes a curvature radius of the image side surface of the first lens, and
TTL denotes a total optical length from the object side surface of the first lens to an image plane of the camera optical lens along an optic axis.

As an improvement, the camera optical lens satisfies:

$-7.06 \le f2/f \le -1.88$; and $0.03 \le d3/TTL \le 0.09$, where f2 denotes a focal length of the second lens,
d3 denotes an on-axis thickness of the second lens, and
TTL denotes a total optical length from an object side surface of the first lens to an image plane of the camera optical lens along an optic axis.

As an improvement, the camera optical lens satisfies:

$-0.35 \le (R5+R6)/(R5-R6) \le 1.12$; and $0.03 \le d5/TTL \le 0.10$, where R5 denotes a curvature radius of an object side surface of the third lens,
R6 denotes a curvature radius of an image side surface of the third lens,
d5 denotes an on-axis thickness of the third lens, and
TTL denotes a total optical length from an object side surface of the first lens to an image plane of the camera optical lens along an optic axis.

As an improvement, the camera optical lens satisfies:

$-1388.38 \le f4/f \le -2.21$;

$0.42 \le (R7+R8)/(R7-R8) \le 117.34$; and $0.03 \le d7/TTL \le 0.10$, where f4 denotes a focal length of the fourth lens,
R7 denotes a curvature radius of an object side surface of the fourth lens,
R8 denotes a curvature radius of the image side surface of the fourth lens, and
TTL denotes a total optical length from an object side surface of the first lens to an image plane of the camera optical lens along an optic axis.

As an improvement, the camera optical lens satisfies:

$0.56 \le f5/f \le 1.80$;

$-0.45 \le (R9+R10)/(R9-R10) \le -0.14$; and $0.06 \le d9/TTL \le 0.21$, where f5 denotes a focal length of the fifth lens,
R9 denotes a curvature radius of the object side surface of the fifth lens,
R10 denotes a curvature radius of an image side surface of the fifth lens,
d9 denotes an on-axis thickness of the fifth lens, and
TTL denotes a total optical length from an object side surface of the first lens to an image plane of the camera optical lens along an optic axis.

As an improvement, the camera optical lens satisfies:

$-1.76 \le (R11+R12)/(R11-R12) \le 0.12$; and $0.04 \le d11/TTL \le 0.12$, where R11 denotes a curvature radius of an object side surface of the sixth lens,
R12 denotes a curvature radius of an image side surface of the sixth lens,
d11 denotes an on-axis thickness of the sixth lens, and
TTL denotes a total optical length from an object side surface of the first lens to an image plane of the camera optical lens along an optic axis.

As an improvement, the camera optical lens satisfies: $TTL/IH \le 1.17$, where IH denotes an image height of the camera optical lens, and TTL denotes a total optical length from an object side surface of the first lens to an image plane of the camera optical lens along an optic axis.

As an improvement, a field of view of the camera optical lens is FOV, and the camera optical lens satisfies: $FOV \ge 86.00°$, where FOV denotes a field of view of the camera optical lens.

The camera optical lens has the following beneficial effects: the camera optical lens has excellent optical characteristics, has the characteristics of large aperture, wide angle and ultra-thinning, and is especially suitable for mobile phone camera lens assemblies and WEB camera lenses composed of camera elements such as high-pixel CCDs and CMOSs.

BRIEF DESCRIPTION OF DRAWINGS

In order to explain the technical solution in the embodiments of the present application more clearly, the drawings used in the description of the embodiments will be briefly introduced below. Obviously, the drawings in the following description are only some embodiments of the present application, and other drawings can be obtained according to these drawings for a person skilled in the art without paying creative work. In the drawing.

DESCRIPTION OF EMBODIMENTS

In order to make the object, technical solution and advantages of the present application clearer, each embodiment of the present application will be described in detail with reference to the accompanying drawings. However, it could be understood by those having ordinary skill in the art that in various embodiments of the present application, many technical details are put forward in order to make readers better understand the present application. However, the technical solution claimed by the present application can be realized even without these technical details or various changes or modifications based on the following embodiments.

First Embodiment

Figure 1:
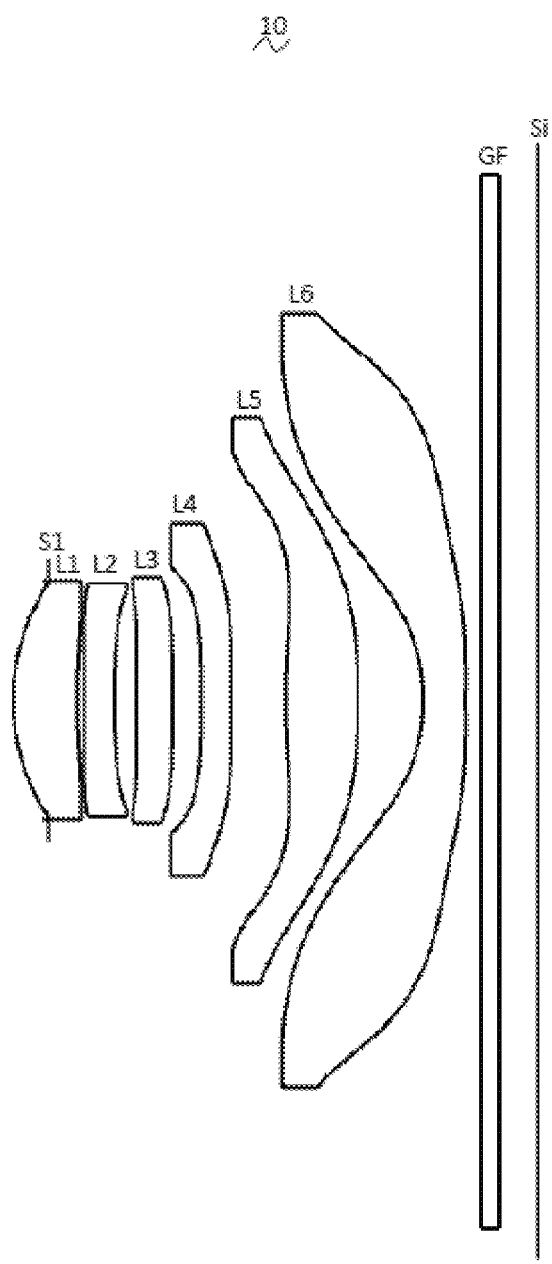
FIG. 1 is a schematic structural diagram of a camera optical lens according to a first embodiment of the present application.

Referring to the drawings, the present application provides a camera optical lens 10. FIG. 1 shows a camera optical lens 10 according to a first embodiment of the present application. Specifically, the camera optical lens 10 includes six lenses, which include an aperture S1, a first lens L1, a second lens L2, a third lens L3, a fourth lens L4, a fifth lens L5, and a sixth lens L6 in sequence from the object side to the image side. Optical elements such as an optical filter GF may be disposed between the sixth lens L6 and an image plane Si.

In this embodiment, the first lens L1 has positive refractive power, the second lens L2 has negative refractive power, the third lens L3 has positive refractive power, the fourth lens L4 has negative refractive power, the fifth lens L5 has positive refractive power, and the sixth lens L6 has negative refractive power.

In this embodiment, the first lens L1 is made of plastic, the second lens L2 is made of plastic, the third lens L3 is made of plastic, the fourth lens L4 is made of plastic, the fifth lens L5 is made of plastic, and the sixth lens L6 is made of plastic.

In this embodiment, a focal length of the camera optical lens 10 is defined as f, and a focal length of the third lens L3 is defined as f3, which satisfy a following relation: $6.50 \le f3/f \le 10.00$. The relation specifies a ratio of the focal length of the third lens to the total focal length, which is helpful to aberration correction and improve imaging quality within the range of the condition.

A curvature radius of an object side surface of the second lens L2 is defined as R3, and a curvature radius of an image side surface of the second lens L2 is defined as R4, which satisfy a following relation: $1.50 \leq (R3+R4)/(R3-R4) \leq 3.00$. The relation specifies the shape of the second lens L2, and the sensitivity of the second lens meeting the condition is low, which is beneficial to improve the production yield.

An on-axis thickness of the first lens L1 is defined as d1, and an on-axis distance from an image side surface of the first lens L1 to an object side surface of the second lens L2 is defined as d2, which satisfy a following relation: $8.00 \leq d1/d2 \leq 10.50$. Within the range of the relation, expression, it is beneficial to lens processing and lens assembly.

An on-axis thickness of the fourth lens L4 is defined as d7, and an on-axis distance from an image side surface of the fourth lens L4 to an object side surface of the fifth lens L5 is d8, which satisfy a following relation: $1.50 \leq d8/d7 \leq 2.00$. Within the range of the relation, it is helpful to compress the length of the system and realize ultra-thinning.

The focal length of the camera optical lens 10 is f, and a focal length of the sixth lens L6 is defined as f6, which satisfy a following relation: $-1.00 \leq f6/f \leq -0.50$. The relation specifies a ratio of the focal length f6 of the sixth lens L6 to the total focal length f. Within the range of the relation, it is helpful to correct a field curvature of the system and improve the imaging quality.

In this embodiment, the object side surface of the first lens L1 is convex at a paraxial position, and the image side surface thereof is concave at a paraxial position.

The focal length of the camera optical lens 10 is f, and a focal length of the first lens L1 is defined as f1, which satisfy a following relation: $0.42 \leq f1/f \leq 1.43$. The relation specifies a ratio of the focal length f1 of the first lens L1 to the total focal length f. Within the specified range, the first lens L1 has a proper positive refractive power, which is beneficial to reduce an aberration of the system, and beneficial to the development of ultra-thinning and wide-angle lens. In an embodiment, $0.67 \leq f1/f \leq 1.15$ is satisfied.

A curvature radius of the object side surface of the first lens L1 is defined as R1, and a curvature radius of the image side surface of the first lens L1 is defined as R2, which satisfy a following relation: $-3.99 \leq (R1+R2)/(R1-R2) \leq -1.22$. The shape of the first lens L1 is reasonably controlled so that the first lens L1 can effectively correct a spherical aberration of the system. In an embodiment, $-2.49 \leq (R1+R2)/(R1-R2) \leq -1.52$ is satisfied.

An on-axis thickness of the first lens L1 is d1, and a total optical length of the camera optical lens 10 is defined as TTL, which satisfy a following relation: $0.05 \leq d1/TTL \leq 0.18$. It is beneficial to realize ultra-thinning within the range of the conditional expression. In an embodiment, $0.08 \leq d1/TTL \leq 0.15$ is satisfied.

In this embodiment, the object side surface of the second lens L2 is convex at a paraxial position, and the image side surface thereof is concave at a paraxial position.

The focal length of the camera optical lens 10 is f, and a focal length of the second lens L2 is defined as f2, which satisfy a following relation: $-7.06 \leq f2/f \leq -1.88$. Reasonable control of negative power of the second lens L2 is beneficial to correct the aberration of the optical system. In an embodiment, $-4.41 \leq f2/f \leq -2.35$ is satisfied.

The total optical length of the camera optical lens 10 is TTL, and an on-axis thickness of the second lens L2 is defined as d3, which satisfy a following relation: $0.03 \leq d3/TTL \leq 0.09$. It is beneficial to realize ultra-thin within the range of the conditional expression. In an embodiment, $0.05 \leq d3/TTL \leq 0.07$ is satisfied.

In this embodiment, the object side surface of the third lens L3 is convex at a paraxial position, and the image side surface thereof is convex at a paraxial position.

A curvature radius of the object side surface of the third lens L3 is defined as R5, and a curvature radius of the image side surface of the third lens L3 is defined as R6, which satisfy the following relation: $-0.35 \leq (R5+R6)/(R5-R6) \leq 1.12$. The relationship defines the shape of the third lens L3, which is beneficial to the molding of the third lens L3 and avoids the poor molding and stress caused by the excessive curvature of the surface of the third lens L3. In an embodiment, $-0.22 \leq (R5+R6)/(R5-R6) \leq 0.89$ is satisfied.

The total optical length of the camera optical lens 10 is TTL, and an on-axis thickness of the third lens L3 is defined as d5, which satisfy a following relation: $0.03 \leq d5/TTL \leq 0.10$. It is beneficial to realize ultra-thinning within the range of the conditional expression. In an embodiment, $0.05 \leq d5/TTL \leq 0.08$ is satisfied.

In this embodiment, the object side surface of the fourth lens L4 is concave at a paraxial position, and the image side surface thereof is concave at a paraxial position.

The focal length of the camera optical lens 10 is f, and a focal length of the fourth lens L4 is defined as f4, which satisfy a following relation: $-1388.38 \leq f4/f \leq -2.21$. The relation specifies a ratio of the focal length f4 of the fourth lens L4 to the focal length f of the system, which makes the system have a better imaging quality and a lower sensitivity through reasonable distribution of the focal power. In an embodiment, $-867.74 \leq f4/f \leq -2.76$ is satisfied.

A curvature radius of the object side surface of the fourth lens L4 is defined as R7, a curvature radius of the image side surface of the fourth lens L4 is defined as R8, and a following relation is satisfied: $0.42 \leq (R7+R8)/(R7-R8) \leq 117.34$. This relation defines the shape of the fourth lens L4. Within the range, it is beneficial to correct an off-axis aberration with the development of ultra-thinning and wide angle. In an embodiment, $0.67 \leq (R7+R8)/(R7-R8) \leq 93.87$ is satisfied.

The total optical length of the camera optical lens 10 is TTL, and an on-axis thickness of the fourth lens L4 is defined as d7, which satisfy a following relation: $0.03 \leq d7/TTL \leq 0.10$. It is beneficial to realize ultra-thinning within the range of the conditional expression. In an embodiment, $0.05 \leq d7/TTL \leq 0.08$ is satisfied.

In this embodiment, the object side surface of the fifth lens L5 is convex at a paraxial position, and the image side surface thereof is convex at a paraxial position.

The focal length of the camera optical lens 10 is f, and a focal length of the fifth lens L5 is defined as f5, which satisfy a following relation: $0.56 \leq f5/f \leq 1.80$. The definition of the fifth lens L5 can effectively smooth a light angle of the camera lens and reduce the tolerance sensitivity. In an embodiment, $0.90 \leq f5/f \leq 1.44$ is satisfied.

A curvature radius of the object side surface of the fifth lens L5 is defined as R9, and a curvature radius of the image side surface of the fifth lens L5 is R10, which satisfy a following relation: $-0.45 \leq (R9+R10)/(R9-R10) \leq -0.14$. This relation defines the shape of the fifth lens L5, and within the range, it is beneficial to correct the off-axis aberration with the development of ultra-thinning and wide angle. In an embodiment, $-0.28 \leq (R9+R10)/(R9-R10) \leq -0.17$ is satisfied.

The total optical length of the camera optical lens 10 is TTL, and an on-axis thickness of the fifth lens L5 is defined as d9, which satisfy a following relation: $0.06 \leq d9/TTL \leq 0.21$. It is beneficial to realize ultra-thinning within the range of the conditional expression. In an embodiment, $0.10 \leq d9/TTL \leq 0.17$ is satisfied.

In this embodiment, the object side surface of the sixth lens L6 is concave at a paraxial position, and the image side surface thereof is concave at a paraxial position.

A curvature radius of the object side surface of the sixth lens L6 is R11, and a curvature radius of the image side surface of the sixth lens L6 is R12, and a following relation is satisfied: $-1.76 \leq (R11+R12)/(R11-R12) \leq 0.12$. This relationship defines the shape of the sixth lens L6, and within the range of condition, it is beneficial to correct the off-axis aberration with the development of ultra-thinning and wide angle. In an embodiment, $-1.10 \leq (R11+R12)/(R11-R12) \leq 0.09$ is satisfied.

The total optical length of the camera optical lens 10 is TTL, and an on-axis thickness of the sixth lens L6 is defined as d11, which satisfy a following relation: $0.04 \leq d11/TTL \leq 0.12$. It is favorable for realizing ultra-thinning within the range of the conditional expression. In an embodiment, $0.06 \leq d11/TTL \leq 0.10$ is satisfied.

In this embodiment, an image height of the camera optical lens 10 is IH, and the total optical length of the camera optical lens 10 is TTL, which satisfy a following relation: $TTL/IH \leq 1.17$. The relation is beneficial to realize ultra-thinning.

In this embodiment, the field of view FOV of the camera optical lens 10 is greater than or equal to 86.00°, thus realizing a wide angle.

In this embodiment, the F number FNO of the camera optical lens 10 is less than or equal to 2.25, thereby realizing a large aperture.

In this embodiment, the focal length of the whole camera optical lens 10 is f, and a combined focal length of the first lens L1 and the second lens L2 is f12, which satisfy a following relation: $0.54 \leq f12/f \leq 1.83$. Within the range of the conditional expression, the aberration and distortion of the camera optical lens 10 can be eliminated, the back focal length of the camera optical lens 10 can be suppressed, and the miniaturization of the image lens system can be maintained. In an embodiment, $0.87 \leq f12/f \leq 1.46$ is satisfied.

When the above relationship is met, the camera optical lens 10 has a good optical performance and can meet the design requirements for a large aperture, a wide angle and ultra-thinning. According to the characteristics of the optical lens 10, the optical lens 10 is particularly suitable for mobile phone camera lens assemblies and WEB camera lenses composed of high-pixel CCDs, CMOSs and other camera g elements.

Next, the camera optical lens 10 according to the present application will be described by way of examples. The symbols recorded in each example are as follows. The units of focal length, on-axis distance, curvature radius, on-axis thickness, inflexion point position and arrest point position are mm.

TTL: a total optical length (an on-axis distance from the object side surface of the first lens L1 to an image plane of the camera optical lens along an optic axis), in units of mm.

An F number FNO: a ratio of an effective focal length of the camera optical lens to an entrance pupil diameter.

In an embodiment, the object side surface and/or the image side surface of the lens can also be provided with inflexion points and/or arrest points to meet the requirements of high-quality imaging. Specific implementation solutions will be described as the follows.

Tables 1 and 2 show design data of the camera optical lens 10 according to the first embodiment of the present application.

TABLE 1

| | R | d | | nd | | vd |
|---|---|---|---|---|---|---|
| S1 | ∞ | d0= | −0.225 | | | |
| R1 | 0.996 | d1= | 0.405 | nd1 | 1.5440 v1 | 56.08 |
| R2 | 3.417 | d2= | 0.040 | | | |
| R3 | 16.863 | d3= | 0.191 | nd2 | 1.6913 v2 | 19.24 |
| R4 | 4.262 | d4= | 0.146 | | | |
| R5 | 25.842 | d5= | 0.213 | nd3 | 1.6173 v3 | 26.22 |
| R6 | −36.813 | d6= | 0.178 | | | |
| R7 | −114.120 | d7= | 0.191 | nd4 | 1.6497 v4 | 21.45 |
| R8 | 9.730 | d8= | 0.341 | | | |
| R9 | 2.908 | d9= | 0.459 | nd5 | 1.5440 v5 | 56.06 |
| R10 | −4.424 | d10= | 0.408 | | | |
| R11 | −1.113 | d11= | 0.268 | nd6 | 1.5352 v6 | 56.11 |
| R12 | 17.240 | d12= | 0.100 | | | |
| R13 | ∞ | d13= | 0.110 | ndg | 1.5168 vg | 64.17 |
| R14 | ∞ | d14= | 0.250 | | | |

The meaning of each symbol in Table 1 is as follows.
S1: aperture;
R: curvature radius at a center of the lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of the object side surface of the optical filter GF;
R14: curvature radius of the image side surface of the optical filter GF;
d: on-axis thickness of a lens and on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;

d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image plane;

nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;
v6: Abbe number of the sixth lens L6;
vg: Abbe number of the optical filter GF.

Table 2 shows aspheric surface data of respective lenses in the camera optical lens 10 according to the first embodiment of the present application.

TABLE 2

| | Conic coefficient | Aspheric coefficient | | | | |
|---|---|---|---|---|---|---|
| | k | A4 | A6 | A8 | A10 | A12 |
| R1 | −1.0998E+00 | 1.2354E−01 | 3.1939E−01 | −3.4068E+00 | 2.4752E+01 | −1.1213E+02 |
| R2 | 4.5589E+00 | −2.4150E−01 | −1.0374E−01 | −9.7797E−01 | 1.9499E+01 | −1.1991E+02 |
| R3 | 2.3082E+02 | −1.2007E−01 | −9.0756E−03 | 5.7407E+00 | −4.3020E+01 | 2.1404E+02 |
| R4 | −5.7424E+01 | 1.4012E−01 | 2.1189E+00 | −3.1830E+01 | 3.5879E+02 | −2.4720E+03 |
| R5 | 1.1760E+03 | −2.9968E−01 | 2.2568E+00 | −3.4078E+01 | 3.1923E+02 | −1.9796E+03 |
| R6 | −3.7431E+02 | −3.4925E−01 | 9.4147E−01 | −1.6429E+00 | −4.4756E+01 | 4.1879E+02 |
| R7 | 2.1090E+04 | −8.3112E−01 | 1.8439E+00 | −1.7334E+00 | −3.7313E+01 | 2.5942E+02 |
| R8 | −1.4102E+03 | −6.6545E−01 | 1.6219E+00 | −4.7681E+00 | 1.1012E+01 | −1.7648E+01 |
| R9 | −2.0693E+01 | −3.3799E−01 | 5.8184E−01 | −1.4067E+00 | 2.2865E+00 | −2.5439E+00 |
| R10 | 5.7180E+00 | 3.7421E−01 | 4.6146E−01 | −8.1501E−01 | 1.5615E+00 | −1.8803E+00 |
| R11 | −1.7126E+00 | −1.2033E+00 | 2.4928E+00 | −2.5765E+00 | 1.6614E+00 | −7.0016E−01 |
| R12 | −1.8969E+03 | 6.8119E−01 | 1.2864E+00 | −1.3307E+00 | 8.7524E−01 | −3.8489E−01 |

| | Conic coefficient | Aspheric coefficient | | | |
|---|---|---|---|---|---|
| | k | A14 | A16 | A18 | A20 |
| R1 | −1.0998E+00 | 3.0875E+02 | −5.0686E+02 | 4.3701E+02 | −1.4857E+02 |
| R2 | 4.5589E+00 | 3.8019E+02 | −6.3735E+02 | 5.1539E+02 | −1.5725E+02 |
| R3 | 2.3082E+02 | −6.9286E+02 | 1.4005E+03 | −1.5217E+03 | 6.3181E+02 |
| R4 | −5.7424E+01 | 1.0560E+04 | −2.7256E+04 | 3.8950E+04 | −2.3525E+04 |
| R5 | 1.1760E+03 | 7.8336E+03 | −1.8919E+04 | 2.5144E+04 | −1.3809E+04 |
| R6 | −3.7431E+02 | −1.8582E+03 | 4.6044E+03 | −6.1438E+03 | 3.4785E+03 |
| R7 | 2.1090E+04 | −8.7827E+02 | 1.6785E+03 | −1.7435E+03 | 7.6206E+02 |
| R8 | −1.4102E+03 | 1.9227E+01 | −1.3205E+01 | 4.9714E+00 | −7.6713E−01 |
| R9 | −2.0693E+01 | 1.8062E+00 | −7.5235E−01 | 1.6608E−01 | −1.4969E−02 |
| R10 | 5.7180E+00 | 1.3162E+00 | −5.2602E−01 | 1.1153E−01 | −9.7342E−03 |
| R11 | −1.7126E+00 | 1.9300E−01 | −3.3613E−02 | 3.3658E−03 | −1.4809E−04 |
| R12 | −1.8969E+03 | 1.1246E−01 | −2.0897E−02 | 2.2263E−03 | −1.0306E−04 |

In Table 2, k is a conic coefficient, and A4, A6, A8, A10, A12, A14, A16, A18 and A20 are aspheric coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

In the above formula, x is a vertical distance between a point on the aspheric curve and the optical axis, and y is an aspheric depth (a vertical distance between the point having a distance of x from the optical axis on the aspheric surface, and a tangent plane to the vertex on the aspheric optical axis).

For convenience, the aspheric surface of each lens surface uses the aspheric surface shown in the above formula (1). However, the present application is not limited to the aspheric polynomial form expressed by the formula (1).

Table 3 and Table 4 show design data of inflexion points and arrest points of respective lenses in the camera optical lens 10 according to the first embodiment of the present application. P1R1 and P1R2 represent the object side surface and the image side surface of the first lens L1 respectively, P2R1 and P2R2 represent the object side surface and the image side surface of the second lens L2 respectively, P3R1 and P3R2 represent the object side surface and the image side surface of the third lens L3 respectively, P4R1 and P4R2 represent the object side surface and the image side surface of the fourth lens L4 respectively, P5R1 and P5R2 represent the object side surface and the image side surface of the fifth lens L5 respectively, and P6R1 and P6R2 represent the object side surface and the image side surface of the sixth lens L6 respectively. The data in the column named "inflexion point position" is vertical distances from inflexion points set on respective lens surfaces to the optical axis of the camera optical lens 10. The data in the column named "arrest point position" is vertical distances from arrest points set on respective lens surfaces to the optical axis of the camera optical lens 10.

TABLE 3

| | Number of inflexion points | Inflexion point position 1 | Inflexion point position 2 | Inflexion point position 3 | Inflexion point position 4 | Inflexion point position 5 |
|---|---|---|---|---|---|---|
| P1R1 | 1 | 0.635 | / | / | / | / |
| P1R2 | 1 | 0.325 | / | / | / | / |
| P2R1 | 0 | / | / | / | / | / |
| P2R2 | 0 | / | / | / | / | / |
| P3R1 | 2 | 0.125 | 0.575 | / | / | / |
| P3R2 | 1 | 0.645 | / | / | / | / |
| P4R1 | 0 | / | / | / | / | / |
| P4R2 | 1 | 0.105 | / | / | / | / |
| P5R1 | 2 | 0.295 | 1.145 | / | / | / |
| P5R2 | 1 | 1.165 | / | / | / | / |
| P6R1 | 2 | 0.755 | 1.905 | / | / | / |
| P6R2 | 5 | 0.085 | 0.795 | 0.975 | 1.925 | 2.085 |

TABLE 4

| | Number of arrest points | Arrest point position 1 |
|---|---|---|
| P1R1 | 0 | / |
| P1R2 | 1 | 0.595 |
| P2R1 | 0 | / |
| P2R2 | 0 | / |
| P3R1 | 1 | 0.205 |
| P3R2 | 0 | / |
| P4R1 | 0 | / |
| P4R2 | 1 | 0.185 |
| P5R1 | 1 | 0.545 |
| P5R2 | 0 | / |

TABLE 4-continued

| | Number of arrest points | Arrest point position 1 |
|---|---|---|
| P6R1 | 0 | / |
| P6R2 | 1 | 0.145 |

Figure 2:
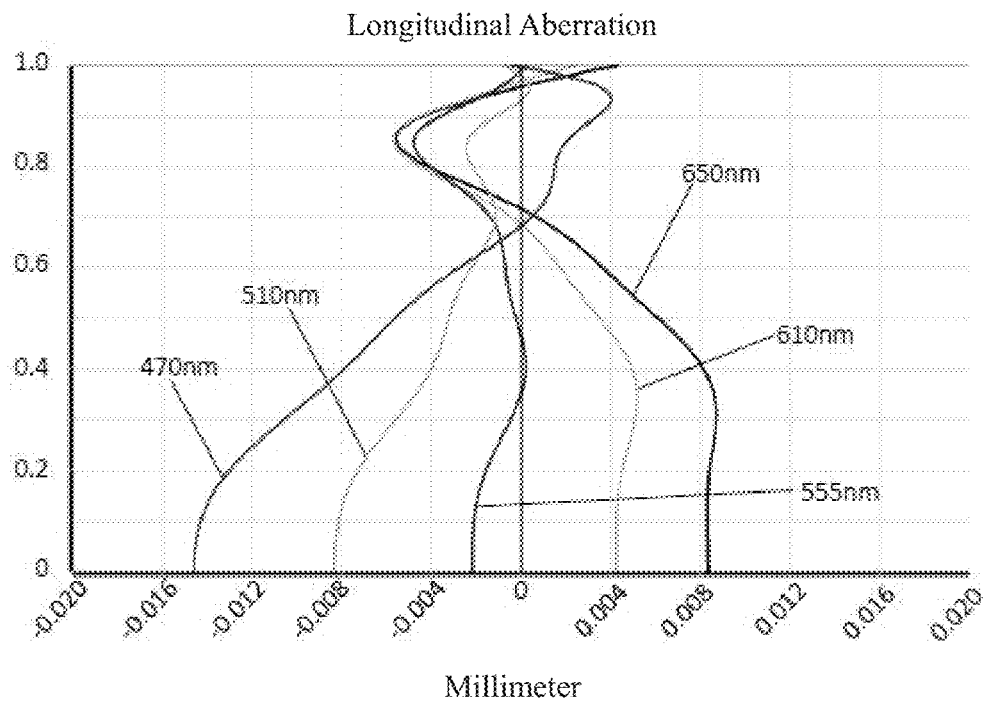
FIG. 2 is a schematic diagram of an longitudinal aberration of the camera optical lens shown in FIG. 1.
Figure 3:
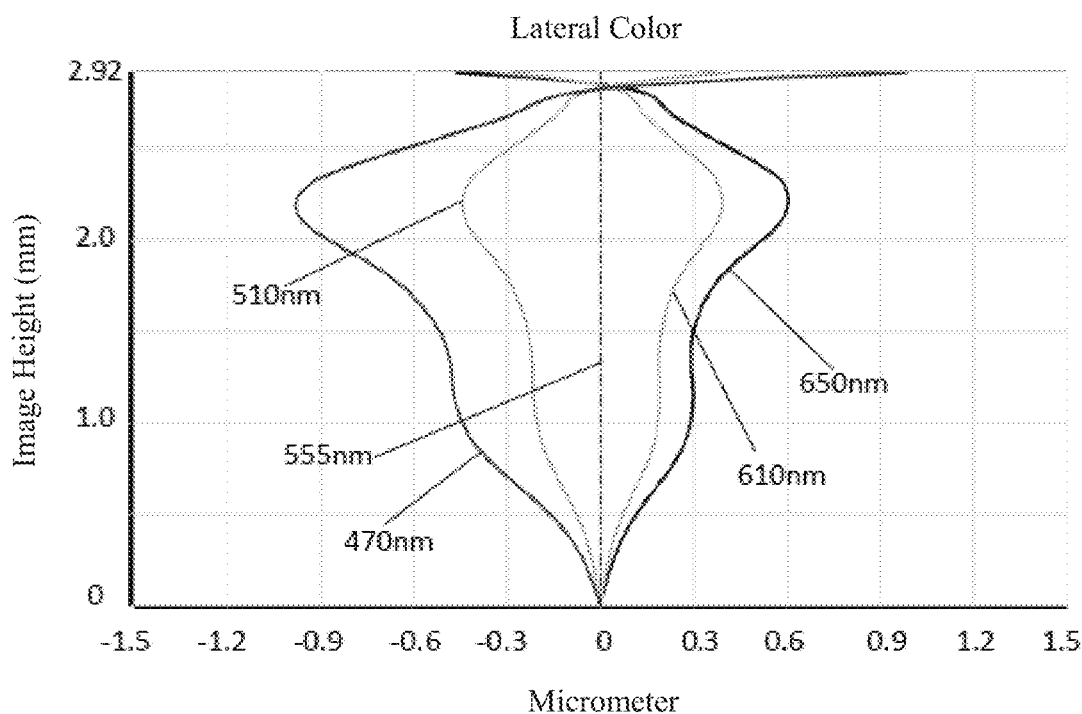
FIG. 3 is a schematic diagram of a lateral color of the camera optical lens shown in FIG. 1.
Figure 4:
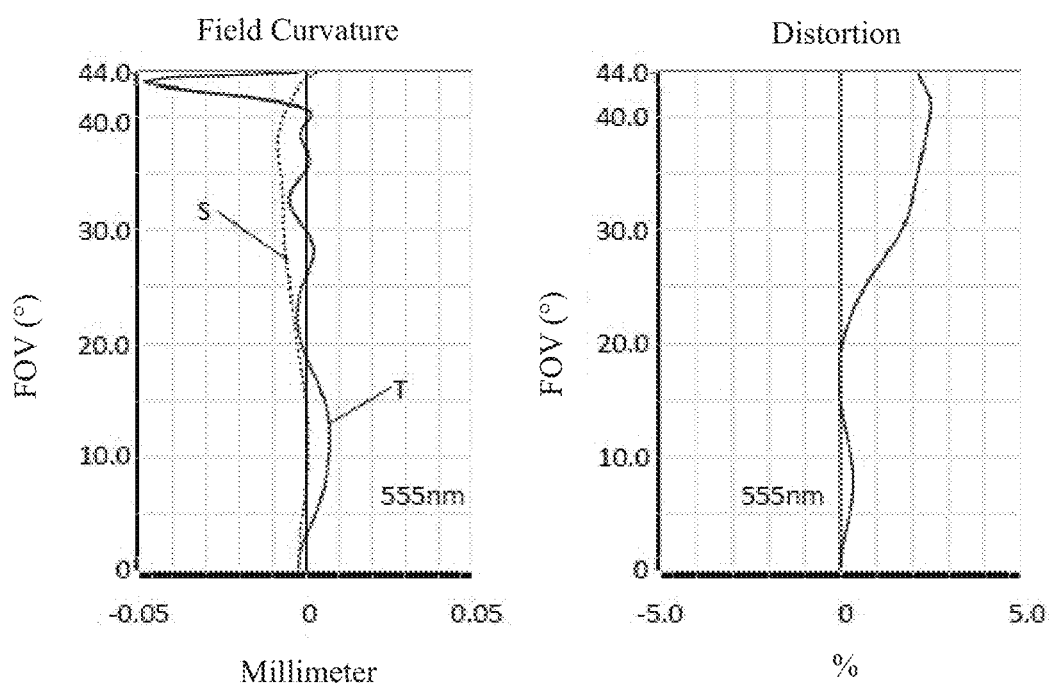
FIG. 4 is schematic diagrams of a field curvature and a distortion of the camera optical lens shown in FIG. 1.
Figure 5:
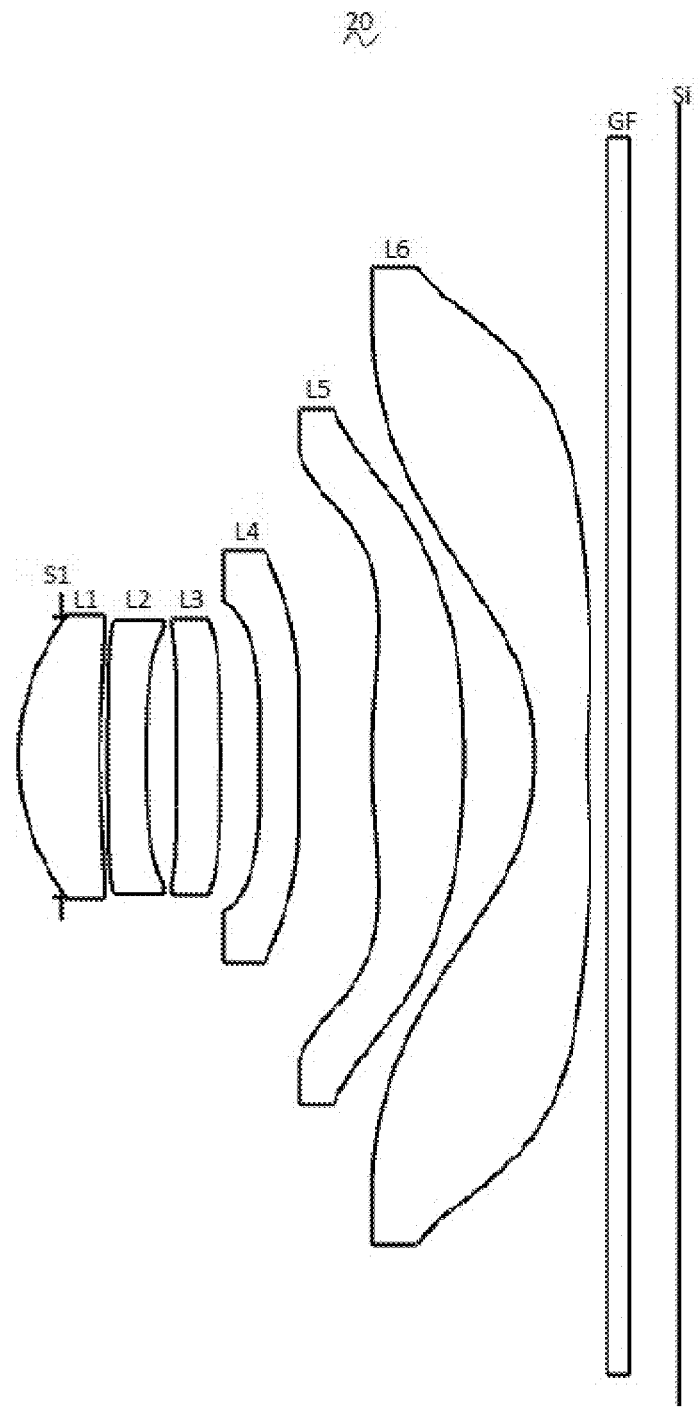
FIG. 5 is a schematic structural diagram of a camera optical lens according to a second embodiment of the present application.

FIG. 2 and FIG. 3 respectively show a longitudinal aberration and a lateral color of light with wavelengths of 650 nm, 610 nm, 555 nm, 510 nm and 470 nm after passing through the camera optical lens 10 of the first embodiment. FIG. 4 is a schematic diagram showing a field curvature and a distortion of light with a wavelength of 555 nm after passing through the camera optical lens 10 of the first embodiment. A field curvature S in FIG. 4 is a field curvature in the sagittal direction and T is a field curvature in a tangential direction.

Table 17 below shows values corresponding to the parameters specified in the conditional expressions for various numerical values in the first, second, third and fourth embodiment.

As shown in Table 17, the camera optical lens in the first embodiment satisfies each conditional expression.

In this embodiment, an entrance pupil diameter ENPD of the camera optical lens 10 is 1.297 mm, the full field image height IH is 2.920 mm, and the field of view FOV in a diagonal direction is 87.95°. The camera optical lens 10 meets the design requirements for large aperture, wide angle and ultra-thinning, its on-axis and off-axis aberrations are fully corrected, and it has excellent optical characteristics.

Second Embodiment

The second embodiment is basically the same as the first embodiment, and involves symbols having the same meanings as the first embodiment. Only differences therebetween will be listed below.

In this embodiment, the object side surface of the fourth lens L4 is convex at a paraxial position.

Table 5 and Table 6 show design data of the camera optical lens 20 according to the second embodiment of the present application.

TABLE 5

| | R | d | nd | vd |
|---|---|---|---|---|
| S1 | ∞ | d0= −0.225 | | |
| R1 | 1.000 | d1= 0.404 | nd1 1.5440 | v1 56.08 |
| R2 | 3.417 | d2= 0.040 | | |
| R3 | 13.498 | d3= 0.191 | nd2 1.6913 | v2 19.24 |

TABLE 5-continued

| | R | d | | nd | | vd | |
|---|---|---|---|---|---|---|---|
| R4 | 4.009 | d4= | 0.152 | | | | |
| R5 | 24.205 | d5= | 0.222 | nd3 | 1.6173 | v3 | 26.22 |
| R6 | -23.039 | d6= | 0.196 | | | | |
| R7 | 232.359 | d7= | 0.191 | nd4 | 1.6497 | v4 | 21.45 |
| R8 | 8.340 | d8= | 0.370 | | | | |
| R9 | 2.913 | d9= | 0.455 | nd5 | 1.5440 | v5 | 56.06 |
| R10 | -4.545 | d10= | 0.351 | | | | |
| R11 | -1.549 | d11= | 0.268 | nd6 | 1.5352 | v6 | 56.11 |
| R12 | 2.726 | d12= | 0.100 | | | | |
| R13 | ∞ | d13= | 0.110 | ndg | 1.5168 | vg | 64.17 |
| R14 | ∞ | d13= | 0.250 | | | | |

Table 6 shows aspheric surface data of respective lenses in the camera optical lens 20 according to the second embodiment of the present application.

TABLE 6

| | Conic coefficient | Aspheric coefficient | | | | |
|---|---|---|---|---|---|---|
| | k | A4 | A6 | A8 | A10 | A12 |
| R1 | -1.1035E+00 | 1.2206E-01 | 3.2901E-01 | -3.5282E+00 | 2.5424E+01 | -1.1445E+02 |
| R2 | 4.5589E+00 | -2.4150E-01 | -1.0374E-01 | -9.7797E-01 | 1.9499E+01 | -1.1991E+02 |
| R3 | 2.4577E+02 | -1.4466E-01 | 3.2026E-01 | -1.0609E-01 | 1.1336E+01 | -8.1668E+01 |
| R4 | -4.8960E+01 | 1.6403E-01 | 1.3330E+00 | -1.7322E+01 | 1.9884E+02 | -1.3629E+03 |
| R5 | 1.4947E+03 | -2.6568E-01 | 1.5450E+00 | -2.1050E+01 | 1.7821E+02 | -1.0331E+03 |
| R6 | 6.7258E+02 | -3.1417E-01 | 8.2802E-01 | -1.7526E+01 | -3.1789E+01 | 2.9866E+02 |
| R7 | 9.8548E+04 | -7.8273E-01 | 1.5543E+00 | -1.7343E+00 | -2.4425E+01 | 1.7251E+02 |
| R8 | -7.3387E+02 | -6.0829E-01 | 1.3375E+00 | -3.6345E+00 | 8.3772E+00 | -1.4199E+01 |
| R9 | -2.7814E+01 | -1.8392E-01 | 2.0331E-01 | -6.7537E-01 | 1.4079E+00 | -1.8620E+00 |
| R10 | 5.7181E+00 | -2.0377E-01 | 1.9110E-01 | -3.1927E-01 | 8.1337E-01 | -1.1423E+00 |
| R11 | -1.5932E+00 | -8.9037E-01 | 1.6894E+00 | -1.5957E+00 | 9.2938E-01 | -3.4979E-01 |
| R12 | -6.8192E+01 | -4.2949E-01 | 6.9812E-01 | -6.3674E-01 | 3.6582E-01 | -1.3966E-01 |

| | Conic coefficient | Aspheric coefficient | | | |
|---|---|---|---|---|---|
| | k | A14 | A16 | A18 | A20 |
| R1 | -1.1035E+00 | 3.1320E+02 | -5.1072E+02 | 4.3778E+02 | -1.4816E+02 |
| R2 | 4.5589E+00 | 3.8019E+02 | -6.3735E+02 | 5.1539E+02 | -1.5725E+02 |
| R3 | 2.4577E+02 | 2.7518E+02 | -4.5843E+02 | 3.7642E+02 | -1.4447E+02 |
| R4 | -4.8960E+01 | 5.7351E+03 | -1.4474E+04 | 2.0152E+04 | -1.1793E+04 |
| R5 | 1.4947E+03 | 3.8994E+03 | -9.1085E+03 | 1.1799E+04 | -6.3087E+03 |
| R6 | 6.7258E+02 | -1.3040E+03 | 3.1729E+03 | -4.1575E+03 | 2.3111E+03 |
| R7 | 9.8548E+04 | -5.9256E+02 | 1.1495E+03 | -1.2113E+03 | 5.3519E+02 |
| R8 | -7.3387E+02 | 1.6241E+01 | -1.1269E+01 | 4.1607E+00 | -6.2014E-01 |
| R9 | -2.7814E+01 | 1.4195E+00 | -5.9693E-01 | 1.2913E-01 | -1.1248E-02 |
| R10 | 5.7181E+00 | 8.3597E-01 | -3.2963E-01 | 6.6843E-02 | -5.4827E-03 |
| R11 | -1.5932E+00 | 8.5393E-02 | -1.3092E-02 | 1.1486E-03 | -4.4108E-05 |
| R12 | -6.8192E+01 | 3.5453E-02 | -5.7579E-03 | 5.4031E-04 | -2.2172E-05 |

Table 7 and Table 8 show design data of inflexion points and arrest points of respective lenses in the camera optical lens 20 according to the second embodiment of the present application.

TABLE 7

| | Number of inflexion points | Inflexion point position 1 | Inflexion point position 2 | Inflexion point position 3 |
|---|---|---|---|---|
| P1R1 | 1 | 0.635 | / | / |
| P1R2 | 1 | 0.325 | / | / |
| P2R1 | 0 | / | / | / |
| P2R2 | 0 | / | / | / |
| P3R1 | 2 | 0.135 | 0.575 | / |
| P3R2 | 0 | / | / | / |
| P4R1 | 1 | 0.025 | / | / |
| P4R2 | 1 | 0.125 | / | / |
| P5R1 | 2 | 0.345 | 1.195 | / |
| P5R2 | 1 | 1.285 | / | / |
| P6R1 | 2 | 0.805 | 2.045 | / |
| P6R2 | 3 | 0.225 | 2.055 | 2.225 |

TABLE 8

| | Number of arrest points | Arrest point position 1 | Arrest point position 2 |
|---|---|---|---|
| P1R1 | 0 | / | / |
| P1R2 | 1 | 0.595 | / |
| P2R1 | 0 | / | / |
| P2R2 | 0 | / | / |
| P3R1 | 1 | 0.225 | / |
| P3R2 | 0 | / | / |
| P4R1 | 1 | 0.035 | / |
| P4R2 | 1 | 0.215 | / |
| P5R1 | 1 | 0.615 | / |
| P5R2 | 0 | / | / |
| P6R1 | 2 | 2.015 | 2.065 |
| P6R2 | 1 | 0.455 | / |

Figure 6:
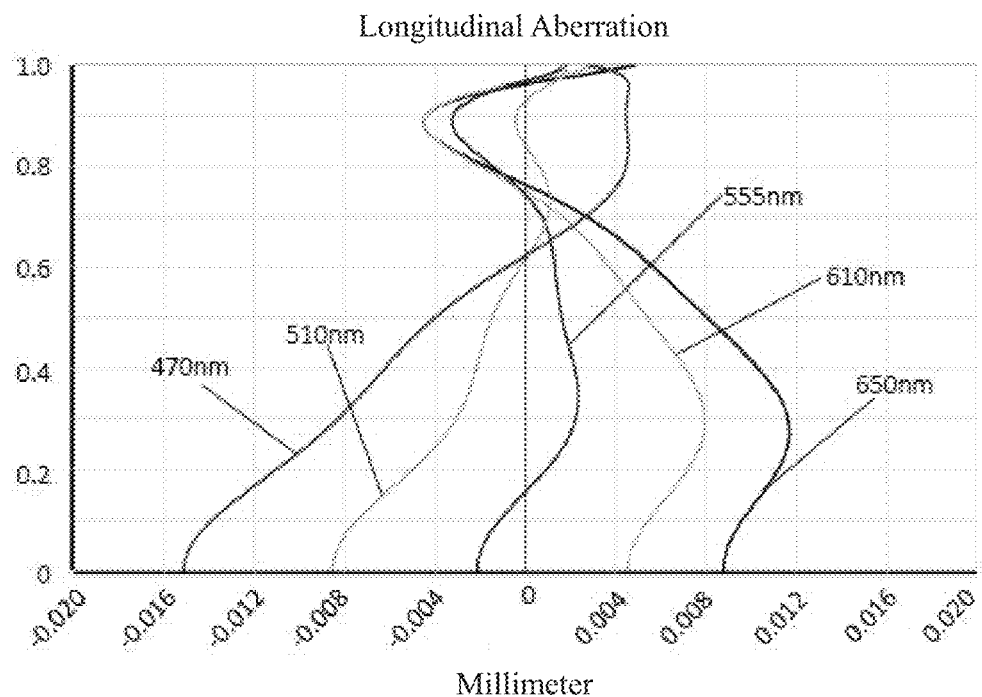
FIG. 6 is a schematic diagram of an longitudinal aberration of the camera optical lens shown in FIG. 5.
Figure 7:
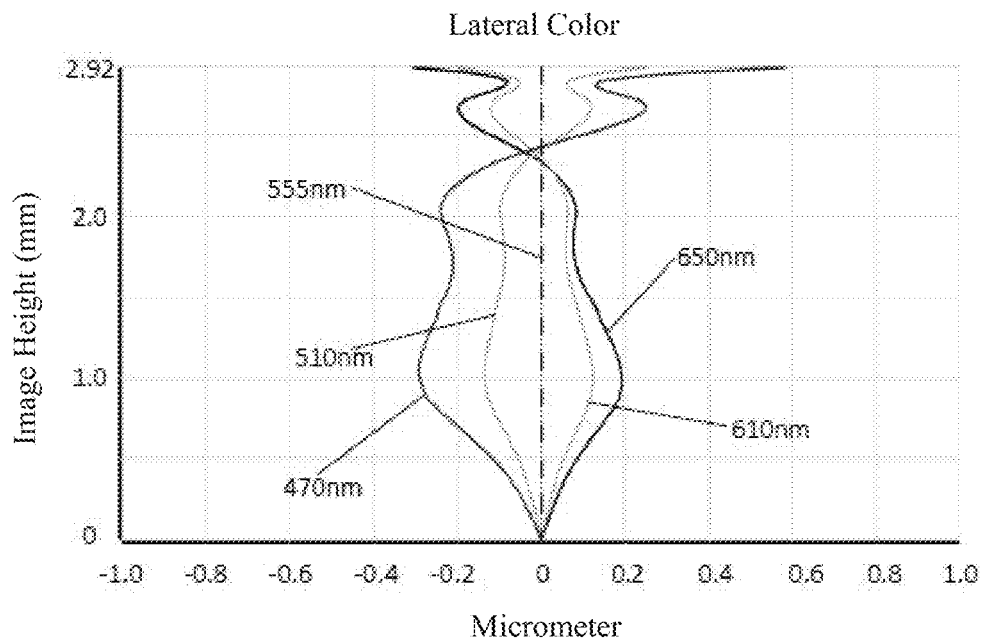
FIG. 7 is a schematic diagram of a lateral color of the camera optical lens shown in FIG. 5.
Figure 8:
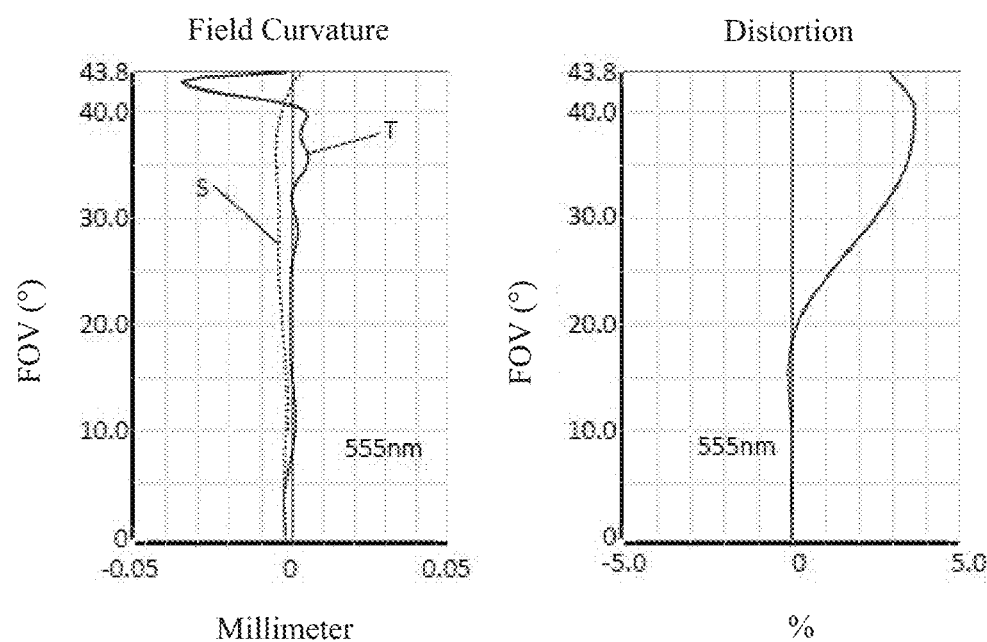
FIG. 8 is schematic diagrams of a field curvature and a distortion of the camera optical lens shown in FIG. 5.
Figure 9:
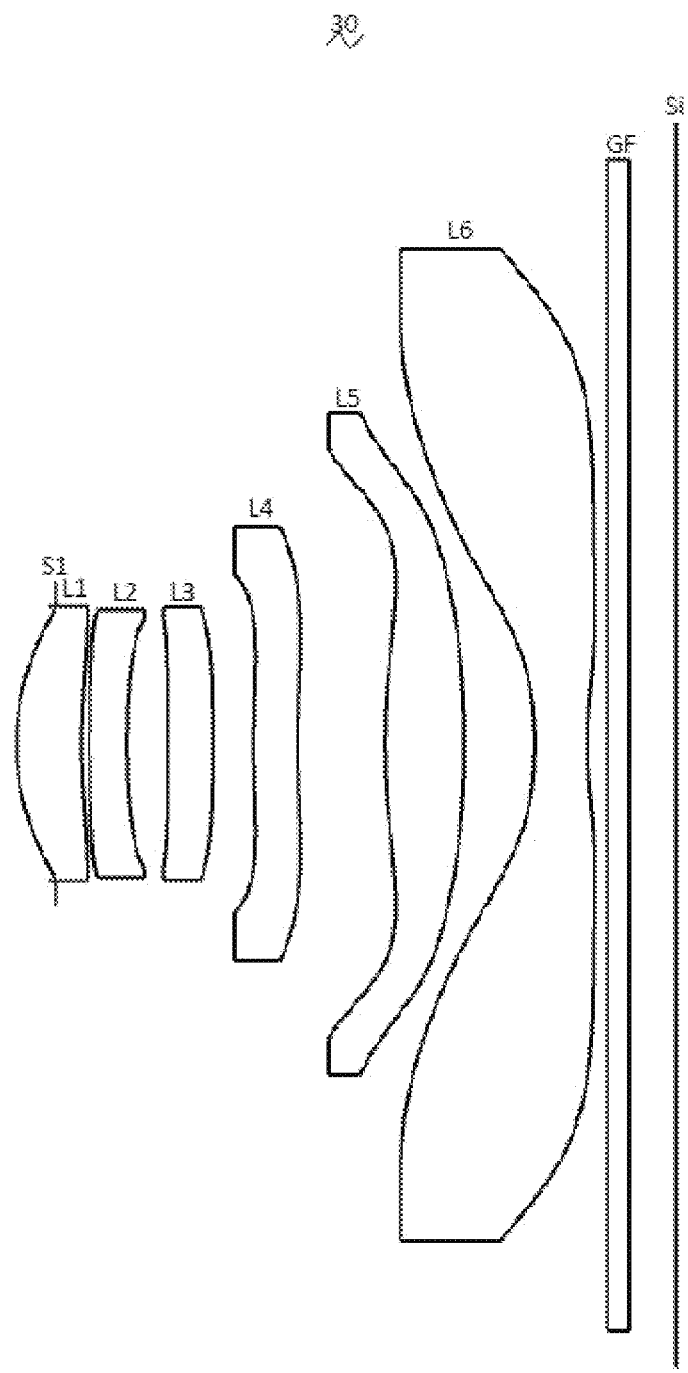
FIG. 9 is a schematic structural diagram of a camera optical lens according to a third embodiment of the present application.

FIG. 6 and FIG. 7 respectively show a longitudinal aberration and a lateral color of light with wavelengths of 650 nm, 610 nm, 555 nm, 510 nm and 470 nm after passing through the camera optical lens 20 of the second embodiment. FIG. 8 shows a schematic diagram of a field curvature and a distortion of light with a wavelength of 555 nm after passing through the camera optical lens 20 of the second embodiment.

As shown in Table 17, the camera optical lens in the second embodiment satisfies each conditional expression.

In this embodiment, the entrance pupil diameter ENPD of the camera optical lens 20 is 1.296 mm, the full field image height IH is 2.920 mm, and the field of view FOV in a diagonal direction is 87.53°. The camera optical lens 20 meets the design requirements for large aperture, wide angle and ultra-thinning, its on-axis and off-axis aberrations are fully corrected, and it has excellent optical characteristics.

Third Embodiment

The third embodiment is basically the same as the first embodiment, and involves the symbols having the same meanings as the first embodiment. Only differences therebetween will be listed below.

In this embodiment, the object side surface of the fourth lens L4 is convex at a paraxial position.

Table 9 and Table 10 show design data of the camera optical lens 30 according to the third embodiment of the present application.

TABLE 9

|     | R        | d     |       | nd     |    | vd    |
|-----|----------|-------|-------|--------|----|-------|
| S1  | ∞        | d0=   | −0.200 |       |    |       |
| R1  | 1.065    | d1=   | 0.332 | nd1    | 1.5440 | v1 | 56.08 |
| R2  | 3.204    | d2=   | 0.040 |        |    |       |
| R3  | 7.365    | d3=   | 0.191 | nd2    | 1.6913 | v2 | 19.24 |
| R4  | 3.588    | d4=   | 0.207 |        |    |       |
| R5  | 138.499  | d5=   | 0.228 | nd3    | 1.6173 | v3 | 26.22 |
| R6  | −20.235  | d6=   | 0.206 |        |    |       |
| R7  | 4.001    | d7=   | 0.224 | nd4    | 1.6497 | v4 | 21.45 |
| R8  | 3.900    | d8=   | 0.444 |        |    |       |
| R9  | 2.876    | d9=   | 0.402 | nd5    | 1.5440 | v5 | 56.06 |
| R10 | −4.428   | d10=  | 0.358 |        |    |       |
| R11 | −1.838   | d11=  | 0.268 | nd6    | 1.5352 | v6 | 56.11 |
| R12 | 1.574    | d12=  | 0.100 |        |    |       |
| R13 | ∞        | d13=  | 0.110 | ndg    | 1.5168 | vg | 64.17 |
| R14 | ∞        | d13=  | 0.240 |        |    |       |

Table 10 shows aspheric surface data of respective lenses in the camera optical lens 30 according to the third embodiment of the present application.

TABLE 10

|     | Conic coefficient | Aspheric coefficient | | | | |
|-----|---|---|---|---|---|---|
|     | k | A4 | A6 | A8 | A10 | A12 |
| R1  | −1.6126E+00 | 1.4106E−01  | 3.4685E−01  | −4.1913E+00 | 2.7909E+01  | −1.1721E+02 |
| R2  | 4.5589E+00  | −2.4150E−01 | −1.0374E−01 | −9.7797E−01 | 1.9499E+01  | −1.1991E+02 |
| R3  | 5.3278E+01  | −1.4658E−01 | 4.1353E−01  | −2.2177E+00 | 2.8777E+01  | −1.6651E+02 |
| R4  | −5.1736E+01 | 2.3233E−01  | 4.4565E−01  | −4.9841E+00 | 7.1385E+01  | −5.3129E+02 |
| R5  | 1.5000E+03  | −2.1959E−01 | 5.8217E−01  | −4.4230E+00 | 2.0194E+01  | −7.4284E+01 |
| R6  | 6.2278E+02  | −3.2913E−01 | 6.0169E−01  | −5.1232E−01 | −2.2046E+01 | 1.6861E+02  |
| R7  | −3.0645E+02 | 6.0534E−02  | −2.9113E+00 | 1.9468E+01  | −8.8033E+01 | 2.6405E+02  |
| R8  | −4.5019E+01 | −3.0852E−01 | 4.9965E−01  | −9.3205E−01 | 1.4071E+00  | −1.7410E+00 |
| R9  | −1.8312E+01 | −2.8344E−02 | −1.0994E−01 | −4.4857E−02 | 4.5187E−01  | −8.6211E−01 |
| R10 | 4.8536E+00  | 1.0440E−02  | −2.7340E−01 | 5.0619E−01  | −2.2573E−01 | −2.9679E−01 |
| R11 | −1.7537E+00 | −8.7026E−01 | 1.6542E+00  | −1.5237E+00 | 8.5697E−01  | −3.1205E−01 |
| R12 | −2.8809E+01 | −4.2517E−01 | 6.5152E−01  | −5.3092E−01 | 2.6535E−01  | −8.5698E−02 |

|     | Conic coefficient | Aspheric coefficient | | | |
|-----|---|---|---|---|---|
|     | k | A14 | A16 | A18 | A20 |
| R1  | −1.6126E+00 | 2.9695E+02  | −4.5245E+02 | 3.6997E+02  | −1.2132E+02 |
| R2  | 4.5589E+00  | 3.8019E+02  | −6.3735E+02 | 5.1539E+02  | −1.5725E+02 |
| R3  | 5.3278E+01  | 5.3887E+02  | −9.6499E+02 | 9.0380E+02  | −3.6540E+02 |
| R4  | −5.1736E+01 | 2.3435E+03  | −6.1080E+03 | 8.7560E+03  | −5.3116E+03 |
| R5  | 1.5000E+03  | 2.3338E+02  | −5.6570E+02 | 8.4254E+02  | −4.9738E+02 |
| R6  | 6.2278E+02  | −6.3839E+02 | 1.3696E+03  | −1.5884E+03 | 7.8345E+02  |
| R7  | −3.0645E+02 | −5.2384E+02 | 6.5515E+02  | −4.6771E+02 | 1.4471E+02  |
| R8  | −4.5019E+01 | 1.4682E+00  | −7.2730E−01 | 1.8747E−01  | −1.9318E−02 |
| R9  | −1.8312E+01 | 7.3052E−01  | −3.0975E−01 | 6.4807E−02  | −5.3505E−03 |
| R10 | 4.8536E+00  | 3.9669E−01  | −1.8878E−01 | 4.1590E−02  | −3.5588E−03 |
| R11 | −1.7537E+00 | 7.4163E−02  | −1.1144E−02 | 9.6357E−04  | −3.6617E−05 |
| R12 | −2.8809E+01 | 1.7940E−02  | −2.3546E−03 | 1.7642E−04  | −5.7654E−06 |

Table 11 and Table 12 show design data of inflexion points and arrest points of respective lenses in the camera optical lens 30 according to the third embodiment of the present application.

TABLE 11

| | Number of inflexion points | Inflexion point position 1 | Inflexion point position 2 | Inflexion point position 3 | Inflexion point position 4 | Inflexion point position 5 |
|---|---|---|---|---|---|---|
| P1R1 | 1 | 0.615 | / | / | / | / |
| P1R2 | 1 | 0.345 | / | / | / | / |
| P2R1 | 0 | / | / | / | / | / |
| P2R2 | 0 | / | / | / | / | / |
| P3R1 | 2 | 0.055 | 0.585 | / | / | / |
| P3R2 | 0 | / | / | / | / | / |
| P4R1 | 1 | 0.235 | / | / | / | / |
| P4R2 | 1 | 0.265 | / | / | / | / |
| P5R1 | 2 | 0.465 | 1.235 | / | / | / |
| P5R2 | 1 | 1.305 | / | / | / | / |
| P6R1 | 2 | 0.765 | 2.015 | / | / | / |
| P6R2 | 5 | 0.265 | 0.835 | 1.075 | 2.225 | 2.325 |

TABLE 12

| | Number of arrest points | Arrest point position 1 |
|---|---|---|
| P1R1 | 0 | / |
| P1R2 | 1 | 0.615 |
| P2R1 | 0 | / |
| P2R2 | 0 | / |
| P3R1 | 1 | 0.095 |
| P3R2 | 0 | / |
| P4R1 | 1 | 0.415 |
| P4R2 | 1 | 0.495 |
| P5R1 | 1 | 0.765 |
| P5R2 | 0 | / |
| P6R1 | 0 | / |
| P6R2 | 1 | 0.635 |

Figure 10:
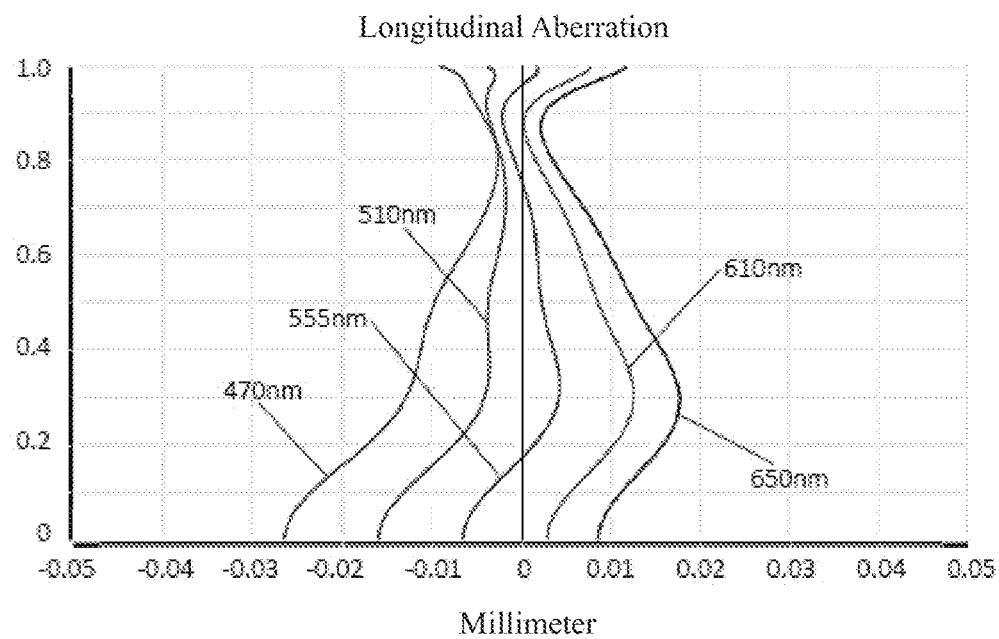
FIG. 10 is a schematic diagram of an longitudinal aberration of the camera optical lens shown in FIG. 9.
Figure 11:
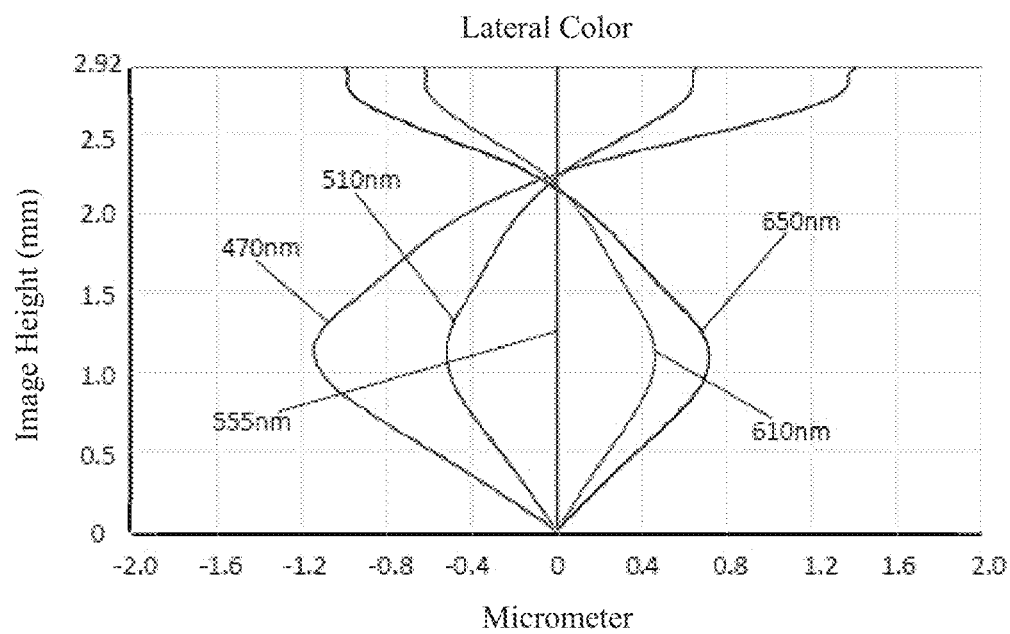
FIG. 11 is a schematic diagram of a lateral color of the camera optical lens shown in FIG. 9.
Figure 12:
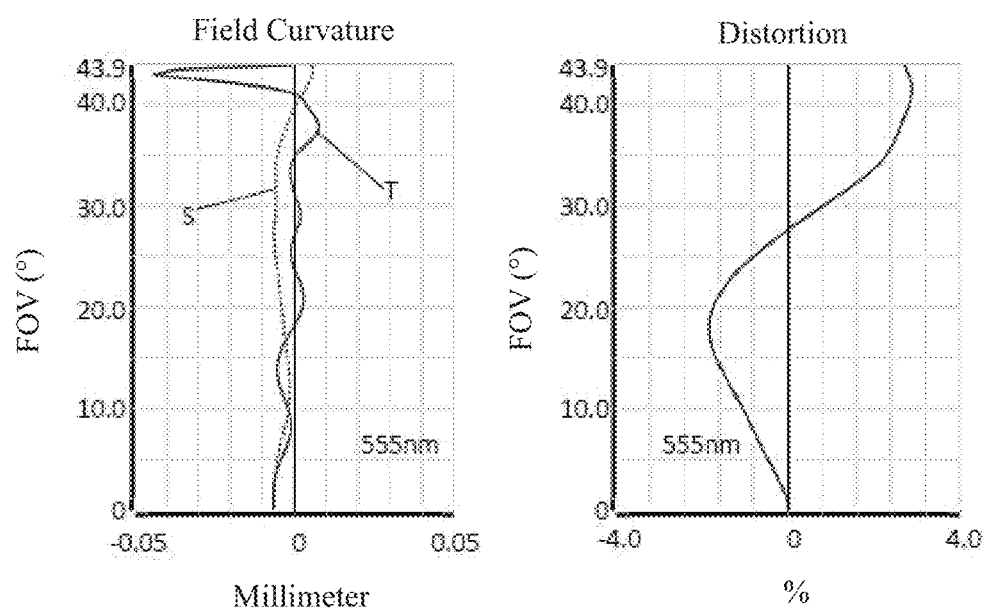
FIG. 12 is schematic diagrams of a field curvature and a distortion of the camera optical lens shown in FIG. 9.
Figure 13:
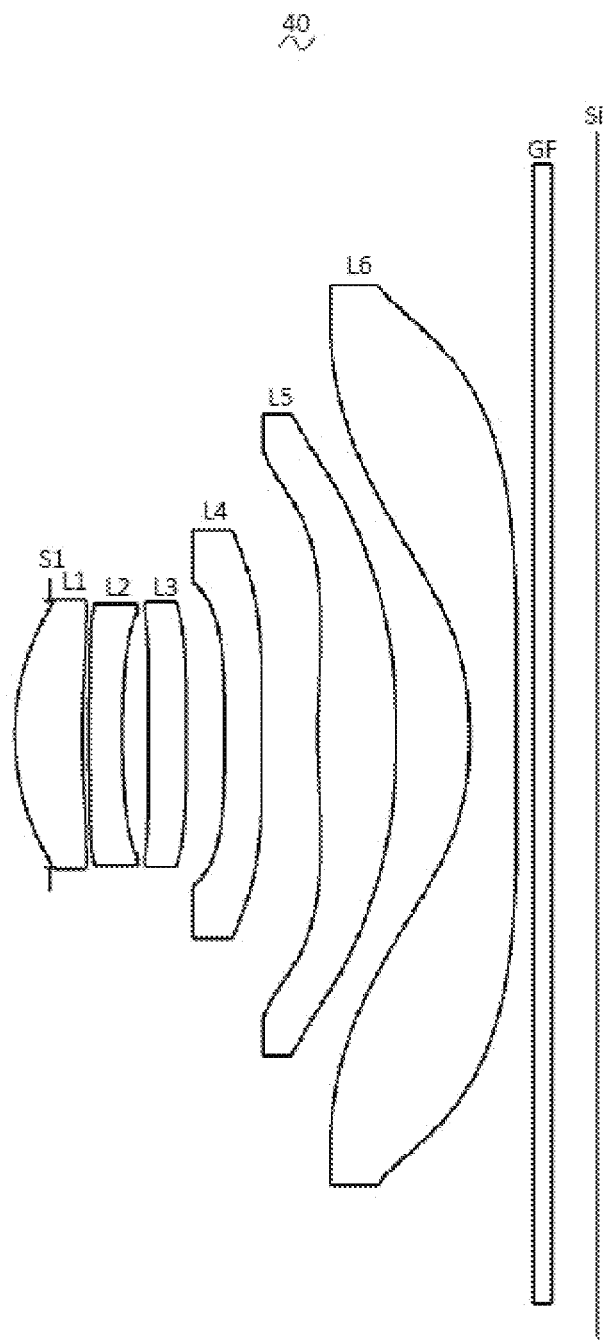
FIG. 13 is a schematic structural diagram of a camera optical lens according to a fourth embodiment of the present application.

FIG. 10 and FIG. 11 respectively show a longitudinal aberration and a lateral color of light with wavelengths of 650 nm, 610 nm, 555 nm, 510 nm and 470 nm after passing through the camera optical lens 30 of the third embodiment. FIG. 12 shows a schematic diagram of a field curvature and a distortion of light with a wavelength of 555 nm after passing through the camera optical lens 30 of the third embodiment.

Table 17 below lists the values corresponding to respective conditional expressions in this embodiment according to the above conditional expressions. Obviously, the camera optical system of this embodiment satisfies the above conditional expressions.

In this embodiment, the entrance pupil diameter ENPD of the camera optical lens 30 is 1.289 mm, the full field image height IH is 2.920 mm, and the field of view FOV in a diagonal direction is 87.75°. The camera optical lens 30 meets the design requirements for large aperture, wide angle and ultra-thinning, its on-axis and off-axis aberrations are fully corrected, and it has excellent optical characteristics.

Fourth Embodiment

The fourth embodiment is basically the same as the first embodiment, and involves the symbols having the same meanings as the first embodiment. Only differences therebetween will be listed below.

In this embodiment, the object side surface of the fourth lens L4 is convex at a paraxial position.

Table 13 and Table 14 show design data of the camera optical lens 40 according to the fourth embodiment of the present application.

TABLE 13

| | R | d | | nd | | vd |
|---|---|---|---|---|---|---|
| S1 | ∞ | d0= | −0.200 | | | |
| R1 | 1.007 | d1= | 0.393 | nd1 | 1.5440 v1 | 56.08 |
| R2 | 3.417 | d2= | 0.040 | | | |
| R3 | 14.871 | d3= | 0.191 | nd2 | 1.6913 v2 | 19.24 |
| R4 | 4.100 | d4= | 0.152 | | | |
| R5 | 24.178 | d5= | 0.222 | nd3 | 1.6173 v3 | 26.22 |
| R6 | −22.722 | d6= | 0.219 | | | |
| R7 | 214.806 | d7= | 0.217 | nd4 | 1.6497 v4 | 21.45 |
| R8 | 6.119 | d8= | 0.327 | | | |
| R9 | 3.024 | d9= | 0.454 | nd5 | 1.5440 v5 | 56.06 |
| R10 | −4.802 | d10= | 0.429 | | | |
| R11 | −1.591 | d11= | 0.268 | nd6 | 1.5352 v6 | 56.11 |
| R12 | 13.714 | d12= | 0.100 | | | |
| R13 | ∞ | d13= | 0.110 | ndg | 1.5168 vg | 64.17 |
| R14 | ∞ | d13= | 0.258 | | | |

Table 14 shows aspheric surface data of respective lenses in the camera optical lens 40 according to the fourth embodiment of the present application.

TABLE 14

| | Conic coefficient | Aspheric coefficient | | | | |
|---|---|---|---|---|---|---|
| | k | A4 | A6 | A8 | A10 | A12 |
| R1 | −1.1778E+00 | 1.3212E−01 | 1.8036E−01 | −1.6581E+00 | 1.1346E+01 | −5.3278E+01 |
| R2 | 4.5589E+00 | −2.4150E−01 | −1.0374E−01 | −9.7797E−01 | 1.9499E+01 | −1.1991E+02 |
| R3 | 3.6939E+02 | −1.2887E−01 | 3.3354E−01 | −3.1885E−01 | 1.4004E+01 | −1.0052E+02 |
| R4 | −4.6702E+01 | 1.7678E−01 | 9.1056E−01 | −8.2160E+00 | 9.4207E+01 | −6.4471E+02 |
| R5 | 1.5000E+03 | −2.4956E−01 | 9.9370E−01 | −1.3284E+01 | 1.1104E+02 | −6.5801E+02 |
| R6 | −6.4342E+02 | −3.0306E−01 | 6.2001E−01 | −1.9586E−01 | −4.0349E+01 | 3.3192E+02 |

TABLE 14-continued

| | R7 | 8.1368E+04 | -7.9914E-01 | 2.5968E+00 | -9.1087E+00 | 6.8869E+00 | 7.9361E+01 |
|---|---|---|---|---|---|---|---|
| | R8 | -4.9325E+02 | -6.0602E-01 | 1.8290E+00 | -5.6929E+00 | 1.2635E+01 | -1.9059E+01 |
| | R9 | -2.3323E+01 | -4.5938E-01 | 9.5109E-01 | -1.7423E+00 | 2.3323E+00 | -2.2277E+00 |
| | R10 | 5.7181E+00 | -4.3222E-01 | 7.7030E-01 | -1.0792E+00 | 1.3781E+00 | -1.3266E+00 |
| | R11 | -1.6487E+00 | -6.2553E-01 | 1.0292E+00 | -8.8011E-01 | 4.8537E-01 | -1.7774E-01 |
| | R12 | -2.8128E+01 | -1.1771E-01 | 1.0627E-01 | -7.8289E-02 | 4.1497E-02 | -1.7211E-02 |

| | Conic coefficient | Aspheric coefficient | | | |
|---|---|---|---|---|---|
| | k | A14 | A16 | A18 | A20 |
| R1 | -1.1778E+00 | 1.5497E+02 | -2.7572E+02 | 2.5514E+02 | -9.0950E+01 |
| R2 | 4.5589E+00 | 3.8019E+02 | -6.3735E+02 | 5.1539E+02 | -1.5725E+02 |
| R3 | 3.6939E+02 | 3.4709E+02 | -6.0561E+02 | 5.2803E+02 | -2.0626E+02 |
| R4 | -4.6702E+01 | 2.7039E+03 | -6.7861E+03 | 9.4134E+03 | -5.4520E+03 |
| R5 | 1.5000E+03 | 2.5696E+03 | -6.2386E+03 | 8.3960E+03 | -4.6265E+03 |
| R6 | -6.4342E+02 | -1.3773E+03 | 3.2435E+03 | -4.1392E+03 | 2.2490E+03 |
| R7 | 8.1368E+04 | -3.8776E+02 | 8.3150E+02 | -9.0324E+02 | 3.9894E+02 |
| R8 | -4.9325E+02 | 1.8761E+01 | -1.1232E+01 | 3.6421E+00 | -4.8555E-01 |
| R9 | -2.3323E+01 | 1.3775E+00 | -5.0582E-01 | 9.9519E-02 | -8.0685E-03 |
| R10 | 5.7181E+00 | 8.1231E-01 | -2.9247E-01 | 5.6392E-02 | -4.4878E-03 |
| R11 | -1.6487E+00 | 4.2810E-02 | -6.5173E-03 | 5.6917E-04 | -2.1766E-05 |
| R12 | -2.8128E+01 | 5.3160E-03 | -1.0955E-03 | 1.2923E-04 | -6.4455E-06 |

Tables 15 and 16 show design data of inflexion points and arrest points of respective lenses in the camera optical lens 40 according to the fourth embodiment of the present application.

TABLE 15

| | Number of inflexion points | Inflexion point position 1 | Inflexion point position 2 | Inflexion point position 3 |
|---|---|---|---|---|
| P1R1 | 1 | 0.625 | / | / |
| P1R2 | 1 | 0.325 | / | / |
| P2R1 | 0 | / | / | / |
| P2R2 | 0 | / | / | / |
| P3R1 | 2 | 0.135 | 0.575 | / |
| P3R2 | 0 | / | / | / |
| P4R1 | 1 | 0.025 | / | / |
| P4R2 | 1 | 0.145 | / | / |
| P5R1 | 2 | 0.265 | 1.215 | / |
| P5R2 | 1 | 1.345 | / | / |
| P6R1 | 2 | 0.905 | 2.095 | / |
| P6R2 | 3 | 0.245 | 2.035 | 2.235 |

TABLE 16

| | Number of arrest points | Arrest point position 1 | Arrest point position 2 |
|---|---|---|---|
| P1R1 | 0 | / | / |
| P1R2 | 1 | 0.595 | / |
| P2R1 | 0 | / | / |
| P2R2 | 0 | / | / |
| P3R1 | 1 | 0.225 | / |
| P3R2 | 0 | / | / |
| P4R1 | 1 | 0.035 | / |
| P4R2 | 1 | 0.255 | / |
| P5R1 | 1 | 0.515 | / |
| P5R2 | 0 | / | / |
| P6R1 | 2 | 2.015 | 2.135 |
| P6R2 | 1 | 0.445 | / |

Figure 14:
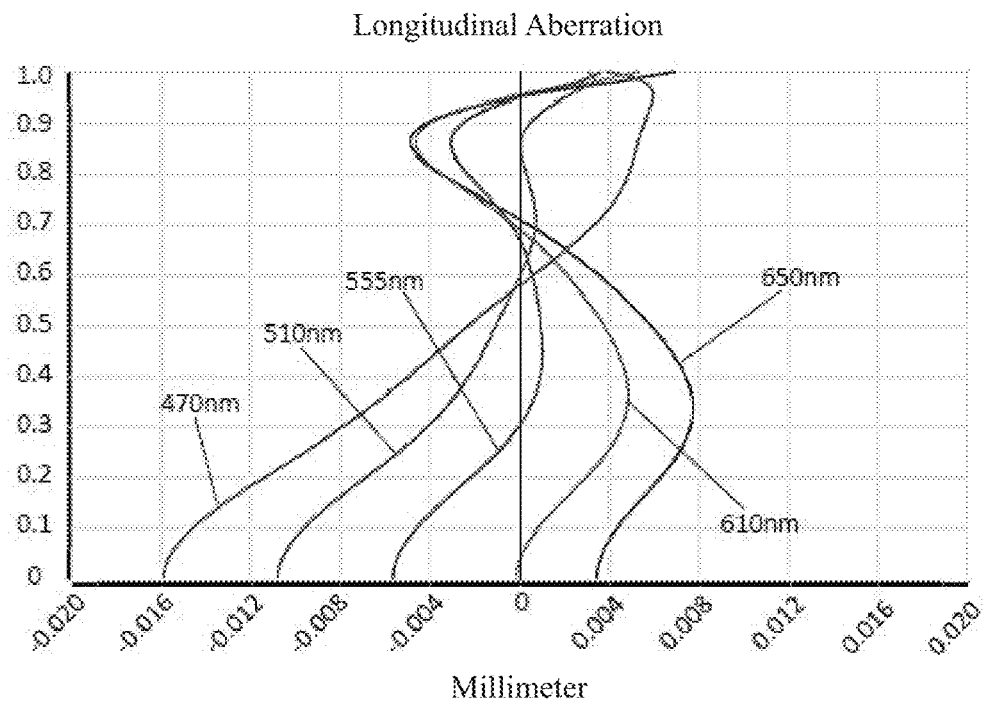
FIG. 14 is a schematic diagram of an longitudinal aberration of the camera optical lens shown in FIG. 13.
Figure 15:
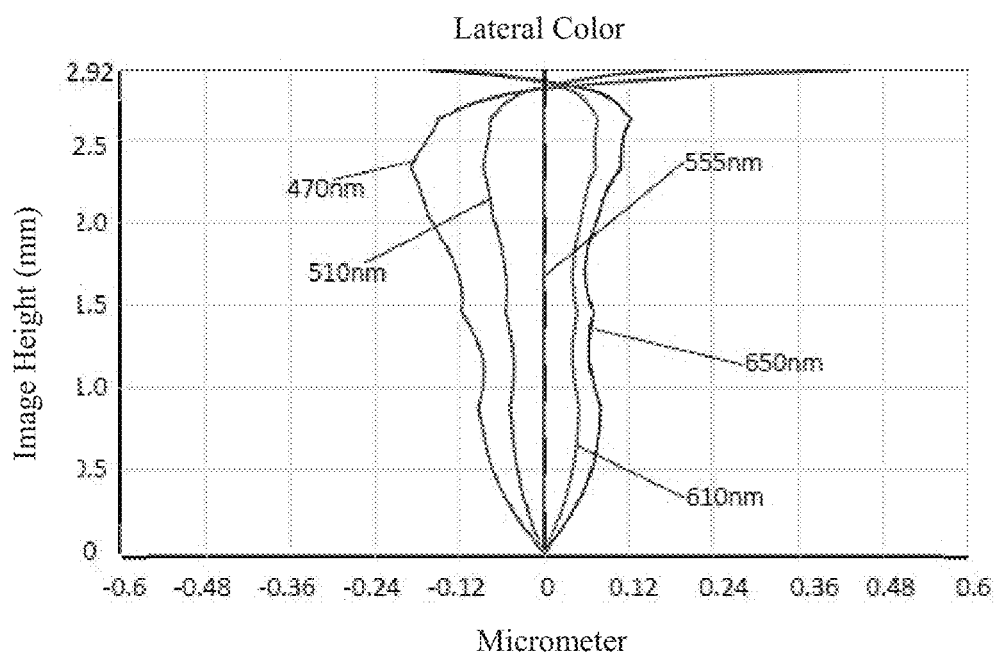
FIG. 15 is a schematic diagram of a lateral color of the camera optical lens shown in FIG. 13.
Figure 16:
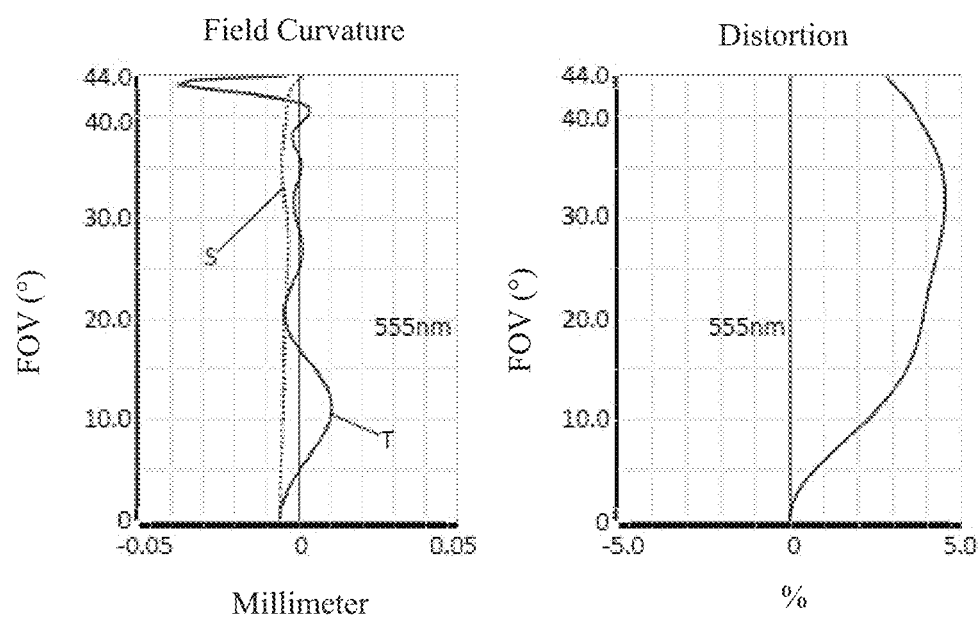
FIG. 16 is schematic diagrams of a field curvature and a distortion of the camera optical lens shown in FIG. 13.

FIG. 14 and FIG. 15 respectively show a longitudinal aberration and a lateral color of light with wavelengths of 650 nm, 610 nm, 555 nm, 510 nm and 470 nm after passing through the camera optical lens 40 according to the fourth embodiment. FIG. 16 shows a schematic diagram of a field curvature and a distortion of light with a wavelength of 555 nm after passing through the camera optical lens 40 of the fourth embodiment.

Table 17 below lists values corresponding to respective conditional expressions in this embodiment according to the above conditional expressions. Obviously, the camera optical system of this embodiment satisfies the above conditional expressions.

In this embodiment, the entrance pupil diameter ENPD of the camera optical lens 40 is 1.289 mm, the full field image height IH is 2.920 mm, and the field of view FOV in the diagonal direction is 87.94°. The camera optical lens 40 meets the design requirements for large aperture, wide angle and ultra-thinning, its on-axis and off-axis aberrations are fully corrected, and it has excellent optical characteristics.

TABLE 17

| Parameter and conditional expression | Embodiment 1 | Embodiment 2 | Embodiment 3 | Embodiment 4 |
|---|---|---|---|---|
| f3/f | 8.38 | 6.52 | 9.80 | 6.51 |
| d1/d2 | 10.13 | 10.10 | 8.30 | 9.83 |
| (R3 + R4)/(R3 − R4) | 1.68 | 1.85 | 2.90 | 1.76 |
| d8/d7 | 1.79 | 1.94 | 1.98 | 1.51 |
| f | 2.918 | 2.916 | 2.900 | 2.900 |
| f1 | 2.431 | 2.445 | 2.772 | 2.475 |
| f2 | -8.226 | -8.241 | -10.239 | -8.173 |
| f3 | 24.459 | 19.024 | 28.420 | 18.879 |
| f4 | -13.675 | -13.208 | -2013.155 | -9.617 |
| f5 | 3.288 | 3.324 | 3.258 | 3.471 |
| f6 | -1.938 | -1.800 | -1.537 | -2.639 |
| f12 | 3.156 | 3.176 | 3.531 | 3.244 |
| FNO | 2.25 | 2.25 | 2.25 | 2.25 |
| TTL | 3.30 | 3.30 | 3.35 | 3.38 |
| IH | 2.92 | 2.92 | 2.92 | 2.92 |
| FOV | 87.95 | 87.53 | 87.75 | 87.94 |

Those of ordinary skill in the art can understand that the above-mentioned embodiments are specific embodiments for realizing the present application, and in practical applications, various changes can be made in form and detail without departing from the spirit and scope of the present application.

What is claimed is:

1. A camera optical lens, comprising from an object side to an image side:
   a first lens having positive refractive power;
   a second lens having negative refractive power;

a third lens having positive refractive power;
a fourth lens having negative refractive power;
a fifth lens having positive refractive power; and
a sixth lens having negative refractive power,
wherein a total number of lenses in the camera optical lens is 6,
wherein the camera optical lens satisfies:

$6.50 \leq f3/f \leq 10.00$;

$1.50 \leq (R3+R4)/(R3-R4) \leq 3.00$;

$-0.45 \leq (R9+R10)/(R9-R10) \leq -0.14$;

$8.00 \leq d1/d2 \leq 10.50$; and $1.50 \leq d8/d7 \leq 2.00$, where
f denotes a focal length of the camera optical lens,
f3 denotes a focal length of the third lens,
R3 denotes a curvature radius of an object side surface of the second lens,
R4 denotes a curvature radius of an image side surface of the second lens,
R9 denotes a curvature radius of the object side surface of the fifth lens,
R10 denotes a curvature radius of an image side surface of the fifth lens,
d1 denotes an on-axis thickness of the first lens,
d2 denotes an on-axis distance from an image side surface of the first lens to the object side surface of the second lens,
d7 denotes an on-axis thickness of the fourth lens, and
d8 denotes an on-axis distance from an image side surface of the fourth lens to an object side surface of the fifth lens.

2. The camera optical lens as described in claim 1, further satisfying:

$-1.00 \leq f6/f \leq -0.50$, where f6 denotes a focal length of the sixth lens.

3. The camera optical lens as described in claim 1, further satisfying:

$0.42 \leq f1/f \leq 1.43$;

$-3.99 \leq (R1+R2)/(R1-R2) \leq -1.22$; and $0.05 \leq d1/TTL \leq 0.18$, where
f1 denotes a focal length of the first lens,
R1 denotes a curvature radius of an object side surface of the first lens,
R2 denotes a curvature radius of the image side surface of the first lens, and
TTL denotes a total optical length from the object side surface of the first lens to an image plane of the camera optical lens along an optic axis.

4. The camera optical lens as described in claim 1, further satisfying:

$-7.06 \leq f2/f \leq -1.88$; and $0.03 \leq d3/TTL \leq 0.09$, where
f2 denotes a focal length of the second lens,
d3 denotes an on-axis thickness of the second lens, and
TTL denotes a total optical length from an object side surface of the first lens to an image plane of the camera optical lens along an optic axis.

5. The camera optical lens as described in claim 1, further satisfying:

$-0.35 \leq (R5+R6)/(R5-R6) \leq 1.12$; and $0.03 \leq d5/TTL \leq 0.10$, where
R5 denotes a curvature radius of an object side surface of the third lens,
R6 denotes a curvature radius of an image side surface of the third lens,
d5 denotes an on-axis thickness of the third lens, and
TTL denotes a total optical length from an object side surface of the first lens to an image plane of the camera optical lens along an optic axis.

6. The camera optical lens as described in claim 1, further satisfying:

$-1388.38 \leq f4/f \leq -2.21$;

$0.42 \leq (R7+R8)/(R7-R8) \leq 117.34$; and $0.03 \leq d7/TTL \leq 0.10$, where
f4 denotes a focal length of the fourth lens,
R7 denotes a curvature radius of an object side surface of the fourth lens,
R8 denotes a curvature radius of the image side surface of the fourth lens, and
TTL denotes a total optical length from an object side surface of the first lens to an image plane of the camera optical lens along an optic axis.

7. The camera optical lens as described in claim 1, further satisfying:

$0.56 \leq f5/f \leq 1.80$;

and $0.06 \leq d9/TTL \leq 0.21$, where
f5 denotes a focal length of the fifth lens,
d9 denotes an on-axis thickness of the fifth lens, and
TTL denotes a total optical length from an object side surface of the first lens to an image plane of the camera optical lens along an optic axis.

8. The camera optical lens as described in claim 1, further satisfying:

$-1.76 \leq (R11+R12)/(R11-R12) \leq 0.12$; and $0.04 \leq d11/TTL \leq 0.12$, where
R11 denotes a curvature radius of an object side surface of the sixth lens,
R12 denotes a curvature radius of an image side surface of the sixth lens,
d11 denotes an on-axis thickness of the sixth lens, and
TTL denotes a total optical length from an object side surface of the first lens to an image plane of the camera optical lens along an optic axis.

9. The camera optical lens as described in claim 1, further satisfying:

$TTL/IH \leq 1.17$, where
IH denotes an image height of the camera optical lens, and
TTL denotes a total optical length from an object side surface of the first lens to an image plane of the camera optical lens along an optic axis.

10. The camera optical lens as described in claim 1, further satisfying:

$FOV \geq 86.00°$, where FOV denotes a field of view of the camera optical lens.

11. The camera optical lens as described in claim 1, wherein an image side surface of the sixth lens is concave at a paraxial position.

* * * * *